United States Patent
Wang et al.

(10) Patent No.: US 12,380,333 B2
(45) Date of Patent: Aug. 5, 2025

(54) METHOD OF CONSTRUCTING NETWORK MODEL FOR DEEP LEARNING, DEVICE, AND STORAGE MEDIUM

(71) Applicant: Beijing Baidu Netcom Science Technology Co., Ltd., Beijing (CN)

(72) Inventors: Haifeng Wang, Beijing (CN); Xiaoguang Hu, Beijing (CN); Hongyu Liu, Beijing (CN); Dianhai Yu, Beijing (CN); Yanjun Ma, Beijing (CN); Tian Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 944 days.

(21) Appl. No.: 17/519,815

(22) Filed: Nov. 5, 2021

(65) Prior Publication Data
US 2022/0058490 A1    Feb. 24, 2022

(30) Foreign Application Priority Data
Nov. 10, 2020   (CN) .......................... 202011249391.2

(51) Int. Cl.
*G06N 3/084*  (2023.01)
*G06N 3/045*  (2023.01)
(52) U.S. Cl.
CPC ............. *G06N 3/084* (2013.01); *G06N 3/045* (2023.01)
(58) Field of Classification Search
CPC .................................................. G06N 3/084
See application file for complete search history.

(56) References Cited

U.S. PATENT DOCUMENTS

2014/0351182 A1   11/2014  Canoy et al.
2016/0358099 A1   12/2016  Sturlaugson et al.
(Continued)

FOREIGN PATENT DOCUMENTS

CN   107423817 A   12/2017
CN   107578453 A   1/2018
(Continued)

OTHER PUBLICATIONS

Kingma, Diederik P., and Jimmy Ba. "Adam: A method for stochastic optimization." arXiv preprint arXiv:1412.6980 (2014). (Year: 2017).*

(Continued)

*Primary Examiner* — Kakali Chaki
*Assistant Examiner* — Charles Jeffrey Jones
(74) *Attorney, Agent, or Firm* — Keating & Bennett, LLP

(57) ABSTRACT

A method and apparatus of constructing a network model for deep learning, a device, and a storage medium, which relate to artificial intelligence, and in particular to a field of deep learning. The method of constructing the network model for deep learning includes: determining an execution mode for executing codes, based on a mode parameter; executing the codes by using a first component, which is executable in a first execution mode, through a syntax element in the codes, in response to determining that the execution mode is the first execution mode; and executing the codes by using a second component, which is executable in a second execution mode, through the syntax element, in response to determining that the execution mode is the second execution mode; wherein the first component and the second component have the same component interface, and the syntax element corresponds to the component interface.

13 Claims, 8 Drawing Sheets

(56) References Cited

U.S. PATENT DOCUMENTS

| | | | |
|---|---|---|---|
| 2019/0188570 | A1 | 6/2019 | Aldea Lopez |
| 2019/0317844 | A1 | 10/2019 | Gottschlich et al. |
| 2019/0354851 | A1 | 11/2019 | Sura et al. |
| 2020/0234116 | A1 | 7/2020 | Valpola |

FOREIGN PATENT DOCUMENTS

| | | |
|---|---|---|
| CN | 108829441 A | 11/2018 |
| CN | 110502739 A | 11/2019 |
| CN | 110569090 A | 12/2019 |
| CN | 111144564 A | 5/2020 |
| JP | 2016-029547 A | 3/2016 |
| JP | 2016-524226 A | 8/2016 |
| JP | 2017-004509 A | 1/2017 |
| JP | 2018-173672 A | 11/2018 |
| WO | 2020/060854 A1 | 3/2020 |

OTHER PUBLICATIONS

Singh, Pramod, Avinash Manure, Pramod Singh, and Avinash Manure. "Introduction to tensorflow 2.0." Learn TensorFlow 2.0: Implement Machine Learning and Deep Learning Models with Python (2020): 1-24. (Year: 2020).*

Combining quality and collaboration in tensorflow. Combining quality and collaboration in TensorFlow—DESOSA 2020. (Mar. 23, 2020). https://desosa.nl/projects/tensorflow/2020/03/23/quality-and-technical-debt (Year: 2020).*

TensorFlow 2 and Keras API (Year: 2020).*

Official Communication issued in corresponding European Patent Application No. 21207420.7, mailed on Apr. 13, 2022.

Moldovan et al., "AutoGraph: Imperative-style Coding with Graph-based Performance", arxiv.org, Cornell University Library, Oct. 16, 2018, pp. 1-12.

"Debugging in PyNative Mode—MindSpore 0.20—alpha documentation", Aug. 7, 2020, https://web.archive.org/web/20200807032128/https://www.mindspore.cn/tutorial/en/0.2.0-alpha/use/debugging_in_pynative_mode.html, retrieved Mar. 29, 2022, pp. 1-6.

Li et al., "Lecture 6: Hardware and Software—Deep Learning Hardware, Dynamic & Static Computational Graph, PyTorch & TensorFlow", http://cs231n.stanford.edu/slides/2020/lecture_6.pdf, Apr. 23, 2020, 131 pages.

Benmeziane, "Master Thesis—Comparison of Deep Learning Frameworks and Compilers", Ecole Nationale Supérieure D'informatique, Jul. 2020, 77 pages.

Official Communication issued in corresponding European Patent Application No. 21207420.7, mailed on Jan. 4, 2023.

"Polymorphism (computer science)", Wikipedia, the free encyclopedia, https://web.archive.org/web/20120524005708/https://en.wikipedia.org/wiki/Polymorphism_(computer_science), retrieved on Sep. 20, 2017, 5 pages.

Official Communication issued in Chinese Application No. 202011249391.2, issued on Jul. 27, 2021.

Yanjun et al., "PaddlePaddle: An Open-Source Deep Learning Platform from Industrial Practice", Persistent Identifiers for eResearch, vol. 1, No. 1, Oct. 2019, pp. 105-115.

Wei et al., "Bitcoin Transaction Forecasting With Deep Network Representation Learning", IEEE Transactions on Emerging Topics in Computing, vol. 9, No. 3, Jul.-Sep. 2021, pp. 1359-1371.

* cited by examiner

METHOD OF CONSTRUCTING NETWORK MODEL FOR DEEP LEARNING, DEVICE, AND STORAGE MEDIUM

CROSS-REFERENCE TO RELATED APPLICATIONS

This application is claims priority to Chinese Application No. 202011249391.2, filed on Nov. 10, 2020, which is incorporated herein by reference in its entirety.

TECHNICAL FIELD

The present disclosure relates to a field of data processing, in particular to a field of artificial intelligence and deep learning, and more specifically to a method of constructing a network model for deep learning, a device, and a storage medium.

BACKGROUND

With development of computer technology, there are already deep learning platforms available for users to simplify a development process. In a deep learning platform, a mode such as a static graph (also known as declarative programming) is generally used to deploy a final network model used for prediction in practical application. For a computing device, the static graph may be executed quickly, which is conducive to deployment. However, at present, users are more accustomed to using a mode such as a dynamic graph (also known as imperative programming) to develop a network model for convenience of training and debugging.

SUMMARY

The present disclosure provides a method of constructing a network model for deep learning, a device, and a storage medium.

According to a first aspect of the present disclosure, there is provided a method of constructing a network model for deep learning, including: determining an execution mode for executing codes, based on a mode parameter; executing the codes by using a first component, which is executable in a first execution mode, through a syntax element in the codes, in response to determining that the execution mode is the first execution mode; executing the codes by using a second component, which is executable in a second execution mode, through the syntax element, in response to determining that the execution mode is the second execution mode; The first component and the second component have the same component interface, and the syntax element corresponds to the component interface.

According to a second aspect of the present disclosure, there is provided an electronic device, including: at least one processor; and a memory communicatively connected to the at least one processor, wherein the memory stores instructions executable by the at least one processor, and the instructions, when executed by the at least one processor, cause the at least one processor to implement the method provided by the present disclosure.

According to a third aspect of the present disclosure, there is provided a non-transitory computer-readable storage medium having computer instructions stored thereon, wherein the computer instructions allow a computer to perform the method described in the first aspect of the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The above and other features, advantages and aspects of the embodiments of the present disclosure will become more apparent in combination with the drawings and with reference to the following detailed description. In the drawings, same or similar reference numerals indicate same or similar elements.

DETAILED DESCRIPTION OF EMBODIMENTS

Figure 1:
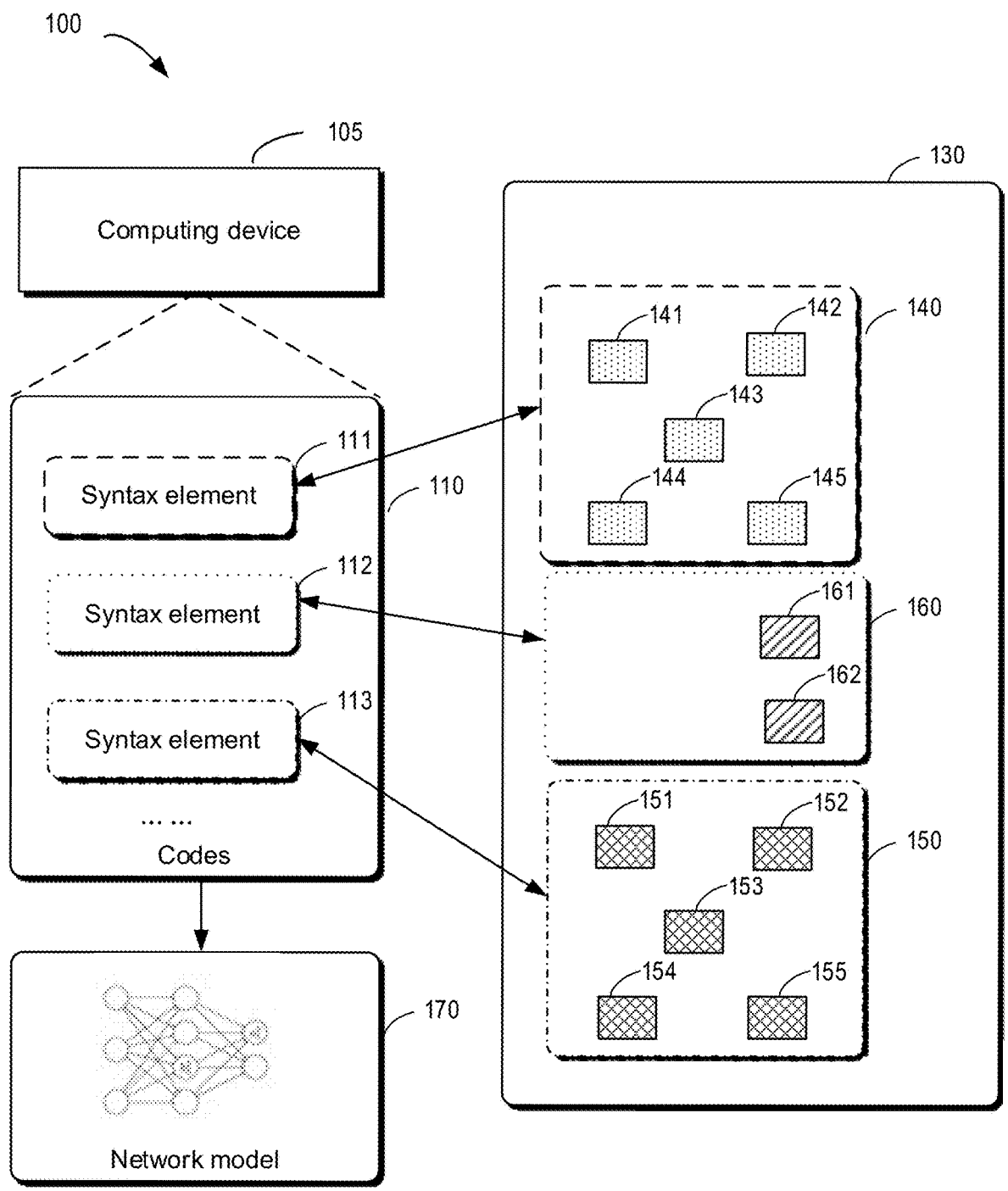
FIG. 1 shows a schematic diagram of an example environment in which various embodiments of the present disclosure may be implemented.

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

In the description of the embodiments of the present disclosure, the term "including" and similar terms should be understood as open-ended inclusion, that is, "including but not limited to". The term "based on" should be understood as "at least partially based on." The term "an embodiment," "one embodiment" or "this embodiment" should be understood as "at least one embodiment." The terms "first,"

"second," and the like may refer to different or the same objects. The following may also include other explicit and implicit definitions.

As described above, in a deep learning platform, a static graph mode is generally used to deploy a final network model used for prediction in practical application. In the static graph mode, the computing device may separately perform a computational graph construction stage and a computational graph execution stage. In the computational graph construction stage, the computing device may define variables and a computational relationship between the variables so as to construct a complete computational graph. There is no input data in this stage. After the computational graph construction stage is completed, the computing device may perform the computational graph execution stage in which the input data is input into the constructed computational graph to obtain output data.

Therefore, in the static graph mode, just a network structure is defined in the computational graph construction stage and the output data corresponding to the network structure cannot be obtained in real time. For users, the static graph mode is not conducive to debugging, especially debugging in a training stage of the network model.

Therefore, in the development of the network model, users are more accustomed to a dynamic graph mode, that is, an immediate execution mode. Unlike the static graph mode, a process performed in the dynamic graph mode is not divided into the computational graph construction stage and the computational graph execution stage. The input data is input while the computational graph is constructed, so the computation may be carried out directly and the output data may be returned. Therefore, in a case of the dynamic graph mode, users may edit the codes more simply, and the output of the network may be known in real time, so that debugging is easier. Therefore, in the training stage of the network model, users prefer to use the dynamic graph mode.

However, API (application program interface) used in the static graph mode is not consistent with the API used in the dynamic graph mode. In a related technology, codes written in a programming language in the dynamic graph mode cannot directly run in the static graph mode.

There may be two solutions. One solution is to rewrite, by a user, the codes that has been debugged in the dynamic graph mode (hereinafter referred to as a dynamic graph codes) to a corresponding codes executable in the static graph mode (hereinafter referred to as a static graph codes). This solution requires a lot of labor, and there is a possibility of introducing new errors in the process of rewriting.

The other solution is to perform a conversion between the dynamic graph codes and the static graph codes (hereinafter referred to as dynamic-static conversion) by a computing device. However, the dynamic-static conversion has certain limitations. First, cost of developing a function related to the conversion is high, and there is a possibility of introducing new errors in the process of conversion. Second, in the process of writing the dynamic graph codes for conversion, although the user may use a control flow (for example, if-else) of a dynamic graph programming language (for example, Python), not all the syntax supported by the programming language may be used, and sometimes it is necessary to switch to a logic used by a static graph programming language, causing users' confusion. Third, in a process of programming, the user often needs to switch to the logic of the static graph, leading to difficulties in debugging. In addition, the codes obtained after the dynamic-static conversion is very complex, and it is difficult to debug if there are problems.

In order to solve at least partially one or more of the above problems and other potential problems, the embodiments of the present disclosure propose a method of constructing a network model for deep learning. With this method, the same component interface is invoked through the same syntax element, and a component that should be invoked in a first execution mode and/or a component that should be invoked in a second execution mode are respectively invoked by using the component interface according to the type of the execution mode. In this way, the computing device may support two execution modes with one set of codes, so as to train and/or deploy the network model for deep learning.

The embodiments of the present disclosure will be described in detail below with reference to the drawings. Here, the term "model" may learn from training data a correlation between corresponding input and output, so that the corresponding output may be generated according to the given input after the training is completed. It should be understood that "model" may also be referred to as "neural network", "learning model", "network model" or "learning network". Examples of the model include, but are not limited to DNN, CNN, RNN, LSTM, or any combination thereof.

Here, the term "component" refers to an encapsulated module that may be invoked by the user in a deep learning framework. The component may include predefined codes, which may be executed to implement associated functions and/or methods, including but not limited to: input and/or output of data, logic control, calculation, network model construction, network model optimization, backward propagation, network model execution, learning rate adjustment, and so on. Various components may be accessed through API technology. The various components may be used as long as the interface is known and accessed through corresponding syntax elements. Here, a component of a data computing class is sometimes referred to as an operator.

Here, the term "syntax element" may represent one or more lines of instruction in the codes, which may indicate a function that needs to be implemented. The syntax element may correspond to various interfaces or contain data. With the syntax element, use of various components as well as input and output of data (such as variables, parameters, constants, vectors, matrices, tensors, parameter lists, etc.) may be achieved. In the process of writing codes, a plurality of syntax elements are combined to realize a description of an arbitrary complex model through an execution structure such as sequential execution, branch condition selection and loop execution.

Here, the term "execution mode" refers to a running mode in which various components may be invoked. The execution mode includes, but is not limited to the dynamic graph mode and the static graph mode described above. It may be understood that, generally, the components executable in different execution modes may be different, and therefore the corresponding APIs may be different.

Here, the term "computational graph" refers to a graph used to describe a combination of operations of a network model. The computational graph may include two types of elements, including a node and an edge. In some embodiments, the node may represent data, such as vector, matrix, tensor, etc., and the edge may represent an operation, such as addition, subtraction, multiplication, division, convolution, etc. However, this is not limited in the present disclosure.

Here, the term "control flow component" refers to a component configured to implement a control flow. The control flow includes, but is not limited to sequence control, branch (which may include double-branch and multi-branch) condition selection control, and loop control. The control flow is to determine an execution order of the syntax elements (and corresponding components) in the codes.

For example, in the dynamic graph mode, syntax elements such as if-else (the control flow component used in Python) may be used to correspond to a branch condition control flow interface so as to use a branch condition control flow component, and syntax elements such as while and for (the control flow component used in Python) may be used to correspond to a loop control flow interface so as to use a loop control flow component.

In the static graph mode, the syntax elements used for (double) branch condition control may be used to correspond to a (double) branch condition control flow interface so as to use the (double) branch condition control flow component, the syntax elements used for (multiple) branch condition control may be used to correspond to a (multiple) branch condition control flow API so as to use the (multiple) branch condition control flow component, and the syntax elements used for loop control may be used to correspond to a loop control flow API so as to use the loop control flow component. In related technology, the syntax elements in the static graph cannot be used directly in the dynamic graph mode.

FIG. 1 shows a schematic diagram of an example environment 100 in which various embodiments of the present disclosure may be implemented. It should be understood that structures and functions of the example environment 100 are described for exemplary purposes only, and not for implying any limitation on the scope of the present disclosure. The embodiments of the present disclosure may also be applied to an environment with different structures and/or functions.

A computing device 105 may execute corresponding processing logics according to syntax elements 111, 112 and 113 included in codes 110, so as to finally construct a network model 170 for deep learning. It may be understood that the codes 110 may include any number of syntax elements for constructing the network model 170.

The computing device 105 may, for example, invoke a first component 140 of a deep learning framework 130 that may be invoked in the first execution mode, according to the syntax element 111. The first component 140 may include, for example, a first control flow component 141, a first network construction component 142, a first network execution component 143, a first network optimization component 144, and a first learning rate adjustment component 145. It may be understood that the first component 140 may further include other components for implementing other functions.

The computing device 105 may, for example, invoke a second component 150 of the deep learning framework 130 that may be invoked in the second execution mode, according to the syntax element 113. The second component 150 may include, for example, a second control flow component 151, a second network construction component 152, a second network execution component 153, a second network optimization component 154, and a second learning rate adjustment component 155. It may be understood that the second component 140 may further include other components for implementing other functions.

The computing device 105 may, for example, invoke a component 160 for modifying the execution mode, according to the syntax element 113. The component 160 includes a mode parameter update component 161 and a mode parameter access component 162.

The above components with same function may be invoked through the same interface. For example, the first control flow component 141 and the second control flow component 151 may share the same interface, and the computing device 105 may invoke the first control flow component 141 and/or the second control flow component 151 through the same syntax element.

The above components may be arbitrarily combined into new components, or be further divided into a plurality of sub-components.

For clarity, the embodiments of the present disclosure will be described below with reference to the environment 100 in FIG. 1. It should be understood that the embodiments of the present disclosure may further include additional actions not shown, and/or actions shown may be omitted. The scope of the present disclosure is not limited in this respect. For ease of understanding, specific data mentioned in the following description are all exemplary and are not used to limit the protection scope of the present disclosure.

Figure 2:
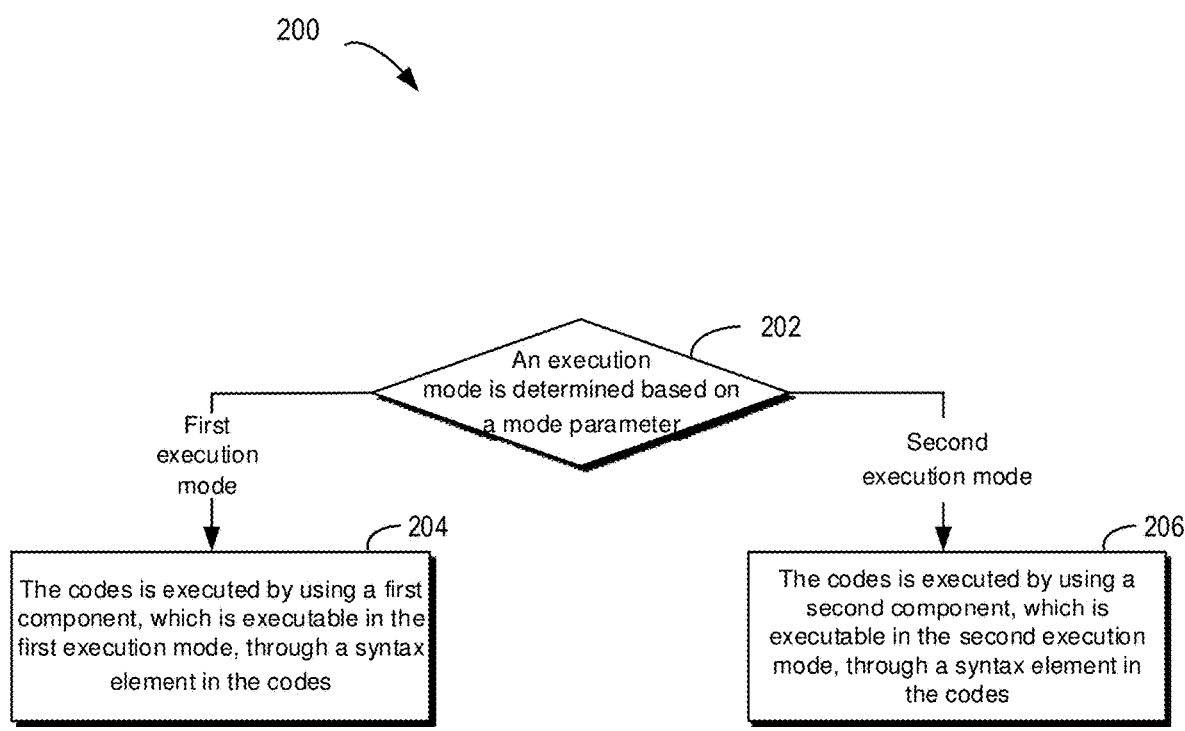
FIG. 2 shows a flowchart of a method of constructing a network model for deep learning according to some embodiments of the present disclosure.

FIG. 2 shows a flowchart of a method 200 of constructing a network model for deep learning according to some embodiments of the present disclosure. For example, the method 200 may be implemented by the computing device 105 shown in FIG. 1. Each action of the method 200 will be described below in detail with reference to FIG. 1.

In block 202, the computing device 105 may determine an execution mode for executing codes, based on a mode parameter.

Specifically, prior to executing the corresponding syntax element in the codes, the computing device 105 may determine whether to execute according to a first execution mode or according to a second execution mode. This may be achieved by setting the mode parameter. For example, when the mode parameter indicates that the execution mode is the first execution mode, the computing device 105 may invoke the first component corresponding to the syntax element in the codes, so as to perform corresponding operations.

In some embodiments, the mode parameter may be updated by invoking the mode parameter update component using the corresponding syntax element. For example, the mode parameter update component may be provided in the deep learning framework, and may be invoked through the corresponding syntax element to perform the update described above. When the syntax element includes a syntax element for enabling the second execution mode (for example, a syntax element for enabling the static graph mode), the computing device 105 may invoke the mode parameter update component to update the mode parameters so as to enable the second execution mode (for example, the static graph mode). When the syntax element includes a syntax element for disabling the second execution mode (for example, a syntax element for disabling the static graph mode), the computing device 105 may invoke the mode parameter update component to update the mode parameter so as to enable the first execution mode (for example, the dynamic graph mode).

In some embodiments, the current mode parameter may be obtained by invoking the mode parameter access component using the corresponding syntax element. For example, the mode parameter access component may be provided in the deep learning framework, and may be invoked through the corresponding syntax element (for example, a syntax element for querying the current execution mode) to obtain the current mode parameter.

Although the first execution mode and the second execution mode are employed in the present disclosure for description, it may be understood that the scheme of the present disclosure may be applied to more execution modes. In some embodiments, the first execution mode includes the dynamic graph mode, and the second execution mode includes the static graph mode. However, the present disclosure is not limited to this.

It may be understood that in order to achieve various functions in the first execution mode and the second execution mode, first component(s) for the first execution mode and second component(s) for the second execution mode may be preset in the deep learning framework, and the first component and the second component (with the same or similar functions, for example) have the same component interface. Therefore, the computing device 105 may invoke these components through the same syntax element in the codes corresponding to the component interface, and execute predetermined codes included in the corresponding component in different execution modes.

If it is determined that the execution mode is the first execution mode, then in block 204, the computing device 105 may execute the codes by using the first component, which is executable in the first execution mode, through the syntax element in the codes.

Specifically, the first execution mode may be a mode in which the computational graph is computed in real time. In this mode, the computing device 105 may perform a first operation corresponding to the first component based on input data associated with the syntax element, so as to determine output data. In this way, the computing device 105 may display the output data to the user in real time so that the user may debug and/or train the network model based on the output data, for example.

If it is determined that the execution mode is the second execution mode, then in block 206, the computing device 105 may execute the codes by using the second component, which is executable in the second execution mode, through the syntax element in the codes.

Specifically, the second execution mode may be a mode in which the computational graph is computed in a non-real-time manner. In this mode, the computing device 105 may firstly determine a computational graph including a plurality of network nodes corresponding to a plurality of computing operations, by using a second operation corresponding to the second component. Then, the computing device 105 may determine the output data by the execution component using the computational graph, based on the input data associated with the syntax element. In this way, the computing device 105 may quickly construct a global computational graph corresponding to the network model so as to, for example, facilitate the deployment and use of the trained network model.

According to the embodiments of the present disclosure, by designing an interface for the component in the first execution mode being identical to an interface for the corresponding component in the second execution mode, the computing device 105 may execute the same set of codes in the first execution mode and the second execution mode respectively to obtain corresponding results, so as to avoid using two sets of codes in the process of constructing the network model due to inconsistent interfaces. The technology according to the present disclosure may support execution of the same codes in different execution modes, so as to facilitate training and deploying of the network model for deep learning.

Figure 3:
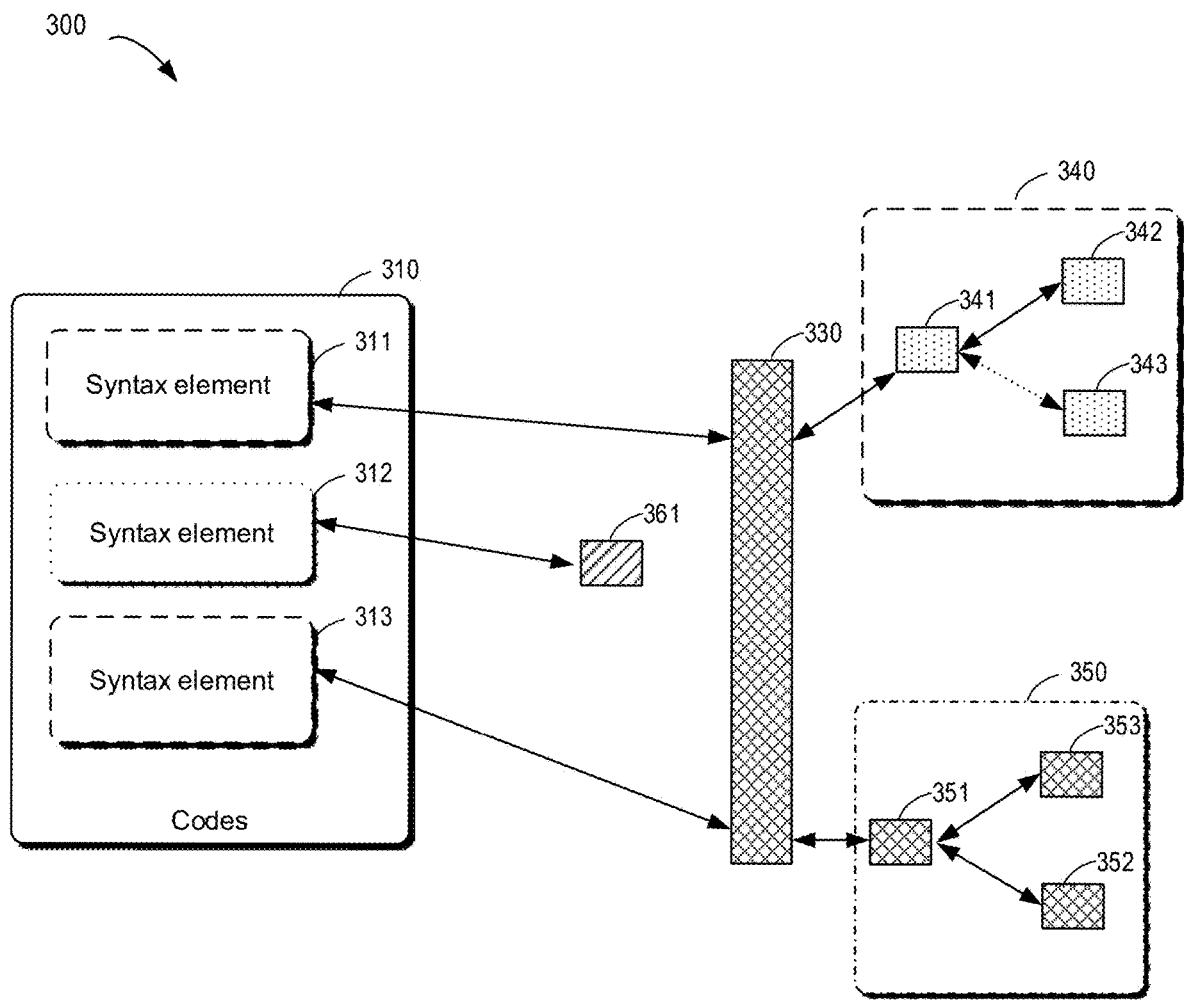
FIG. 3 shows a schematic diagram of a method of executing a control flow component by a computing device according to some embodiments of the present disclosure.

FIG. 3 shows a schematic diagram of a method 300 of executing a control flow component by the computing device 105 according to some embodiments of the present disclosure.

The control flow component refers to a component configured to implement a control flow. The control flow includes, but is not limited to sequence control, branch (which may include double-branch and multi-branch) condition selection control, and loop control. For example, as described above, in related schemes, control flow component used in the static graph mode is different from the control flow component used in the dynamic graph mode.

According to the embodiments of the present disclosure, the control flow component used in the first execution mode and the control flow component used the second execution mode may be designed to have the same component interface, that is, a control flow component interface 330. The control flow component interface 330 may include a branch condition selection control component interface (which may correspond, for example, to a syntax element for branch condition control) and a loop control component interface (which may correspond, for example, to a syntax element for loop control). In some embodiments, the control flow interface may be designed to be consistent with the control flow interface in the original static graph mode, so as to be used through the original syntax element. In other embodiments, the control flow interface may also be designed to be used through a new syntax element.

In the first execution mode, when the syntax element 311 corresponding to the control flow interface 330 is executed by the computing device 105, the computing device 105 may use the first control flow component 341 in the first component 340.

For example, when the first control flow component 341 is a branch condition selection control component, the computing device 105 may determine a return value of a comparison function based on the input data, and thereby determine in real time which branch function needs to be executed (that is, invoke a component 342 or a component 343).

For example, when the first control flow component 341 is a loop control component, the computing device 105 may determine in real time whether it is necessary to terminate the loop, according to the input data, and in response to determining that it is not necessary to terminate the loop, execute a loop logic and operate on a loop variable so as to acquire an updated variable.

The computing device 105 may, for example, invoke the mode parameter update component 361 through the syntax element 312 in the codes 310 so as to switch the execution mode from the first execution mode to the second execution mode.

In the second execution mode, when the syntax element 313 (being the same as the syntax element 311) corresponding to the control flow interface 330 is executed by the computing device 105, the computing device 105 may use the second control flow component in the second component 350.

For example, when the second control flow component 341 is a branch condition selection control component, the computing device 105 may determine a computational graph for the branch condition selection, for example, setting an operation node of the comparison function and setting an operation node of the branch function (that is, a component 352 and a component 353). Then, the computing device 105 may acquire the output of the computational graph by executing the network execution component of the second execution mode.

For example, when the first control flow component 341 is a loop control component, the computing device 105 may determine the computational graph for the loop operation in real time. Then, the computing device 105 may acquire the output of the computational graph by executing the network execution component of the second execution mode.

In this way, by unifying the control flow components of the two execution modes to have the same control flow interface, the computing device 105 may invoke these control flow components through the same component interface by using the same syntax element, so as to support the execution of different processing logics in different execution modes.

Through the implementation of unified interface of the two execution modes (for example, the dynamic graph and the static graph), developers only need to write one set of codes to run in two execution modes. The computing device may execute this set of codes in the dynamic graph mode and the static graph mode respectively. In this way, it is possible to not only keep the advantages of the dynamic graph (that is, easy to debug), but also keep the advantages of the static graph (that is, convenient for global optimization and prediction deployment), and avoid rewriting the codes or performing dynamic-static conversion on the codes.

Figure 4:
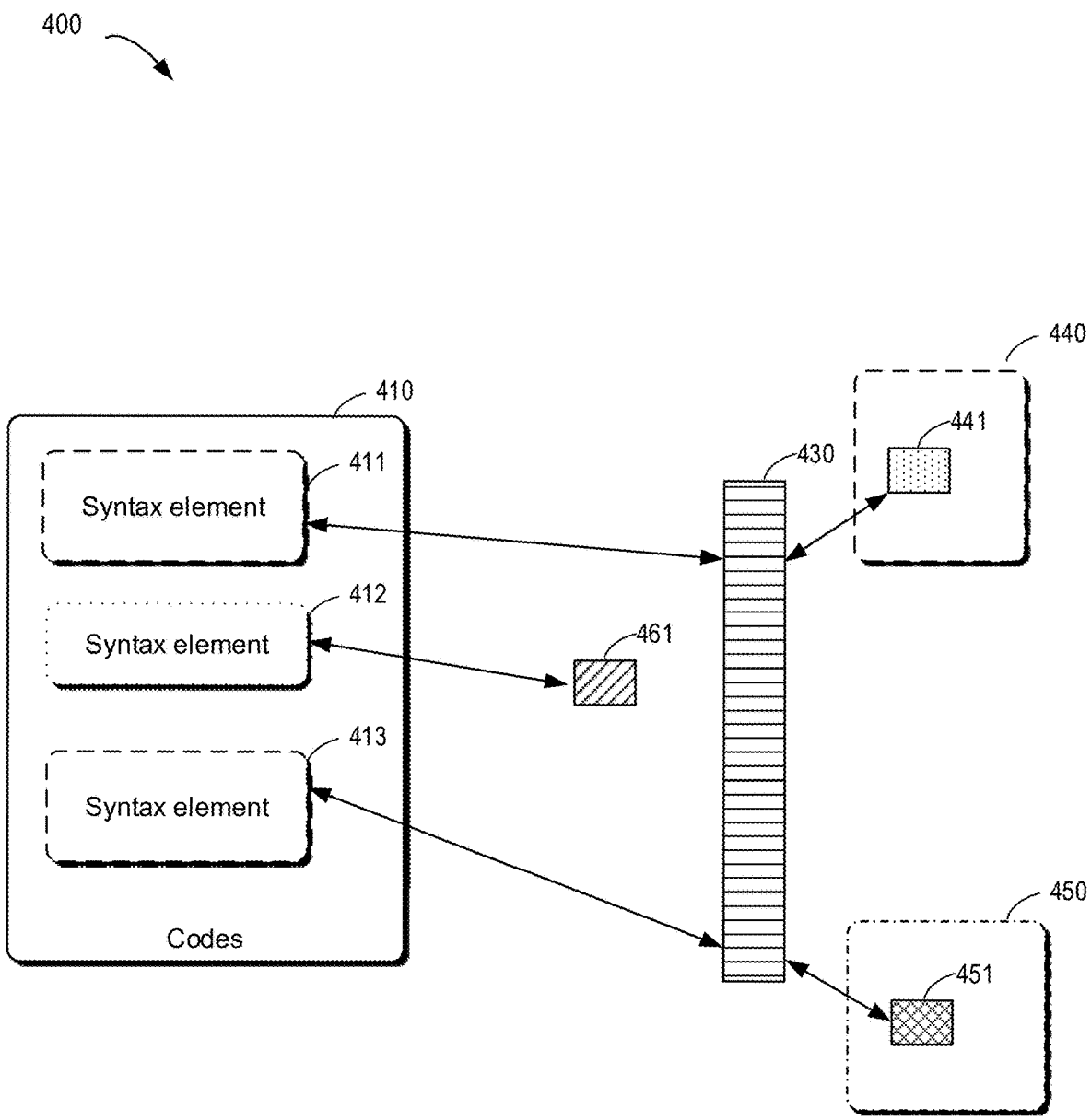
FIG. 4 shows a schematic diagram of a method of executing a component by a computing device according to some embodiments of the present disclosure.

FIG. 4 shows a schematic diagram of a method 400 of executing a component by the computing device 105 according to some embodiments of the present disclosure.

The mode in which the computing device 105 executes the computational graph is different between the first execution mode and the second execution mode. For example, as described above, the computing device 105 calculates the computational graph in the static graph mode through additional codes for invoking the network execution component. Therefore, the codes may include redundant codes for implementing the above execution.

According to the embodiments of the present disclosure, such components used in the first execution mode and the second execution mode may be designed to have the same component interface, for example, a network execution component interface 430. The method of implementing the execution function the second execution mode may also be encapsulated into the corresponding component 451, so that the codes 410 does not need to include different syntax elements corresponding to the method of implementing the execution function.

In the first execution mode, when the syntax element 411 corresponding to the network execution component interface 430 is executed by the computing device 105, the computing device 105 may process the input data by using the first network execution component 441 in the first component 440, so as to acquire the output data.

The computing device 105 may, for example, invoke the mode parameter update component 461 through the syntax element 412 in the codes 410 so as to switch the execution mode from the first execution mode to the second execution mode.

In the second execution mode, when the syntax element 413 (being the same as the syntax element 411) corresponding to the network execution component interface 430 is executed by the computing device 105, the computing device 105 may process the input data by using the second network execution component 451 in the second component 440, so as to acquire the output data.

In some embodiments, class tags (e.g. of dynamic graph mode class and static graph mode class) may be set for the first network execution component and the second network execution component respectively, so as to facilitate the computing device 105 to invoke the network execution component in the corresponding execution mode.

In some embodiments, the first network execution component 441 and the second network execution component 451 may be designed to support operations on encapsulated hold objects and encapsulated hold functions.

In some embodiments, the first network execution component 441 may be configured to, when a syntax element configured to be executed in the second execution mode (for example, codes for determining a placeholder) is to be executed by the computing device 105, skip execution of such syntax element without errors.

In some embodiments, the second network execution component 451 may be configured to, when executed, cause the computing device 105 to determine a first computational graph for the input data based on the input data and to process the input data based on the first computational graph so as to obtain the output data.

Specifically, in the second execution mode, since the input variable (also known as the "placeholder") needs to be defined, the second network execution component 451 may be configured to automatically determine the placeholder based on the shape and type of data to be input, so as to generate the computational graph. Then, the computing device 105 may perform the corresponding operation on the input data based on the generated computational graph, so as to determine the output data. In this case, the codes 440 do not need to include the syntax element configured to be executed in the second execution mode, so that the codes 440 in different execution modes may be fully unified.

In some embodiments, because a batch size (batch_size) of batch data may change during the processing of the batch data, the second network execution component 451 may be further configured to set the placeholder in a manner adapted to the batch size. This may be achieved, for example, by setting a first dimension of a function used for placeholder inference as a variable dimension.

In some embodiments, in order to avoid repeatedly constructing the computational graph used in the second execution mode in a process such as loop or iterative execution, the second network execution component 451 may be further configured to: when executed by the computing device 105, determine a type of a computational graph construction tag. If the tag indicates that the computational graph has not been constructed, the computing device 105 may determine the first computational graph for the input data. If the tag indicates that the computational graph has been constructed, the first computational graph already constructed may be used instead of constructing the computational graph again. Similar steps may also be applied to other processes including computational graph construction.

In some embodiments, the above network execution component may be configured to perform corresponding operations according to the type of the input data.

In this way, the computing device 105 may invoke the network execution components by using the same syntax element through the same component interface. The computing device 105 may execute the execution logic included in the corresponding components respectively according to different execution modes, so as to support the processing of input data in different execution modes.

In some embodiments, the interface of the network construction component may be designed in a similar way. In the first execution mode, when the syntax element corresponding to the network construction component is executed by the computing device 105, the computing device 105 may use the network construction component through the first control flow component. In the second execution mode, when the syntax element corresponding to the network construction component is executed by the computing device 105, the computing device 105 may use the network construction component through the second control flow component.

In this way, the computing device 105 may use components such as LSTM for network construction in both execution modes through the same syntax element.

Figure 5:
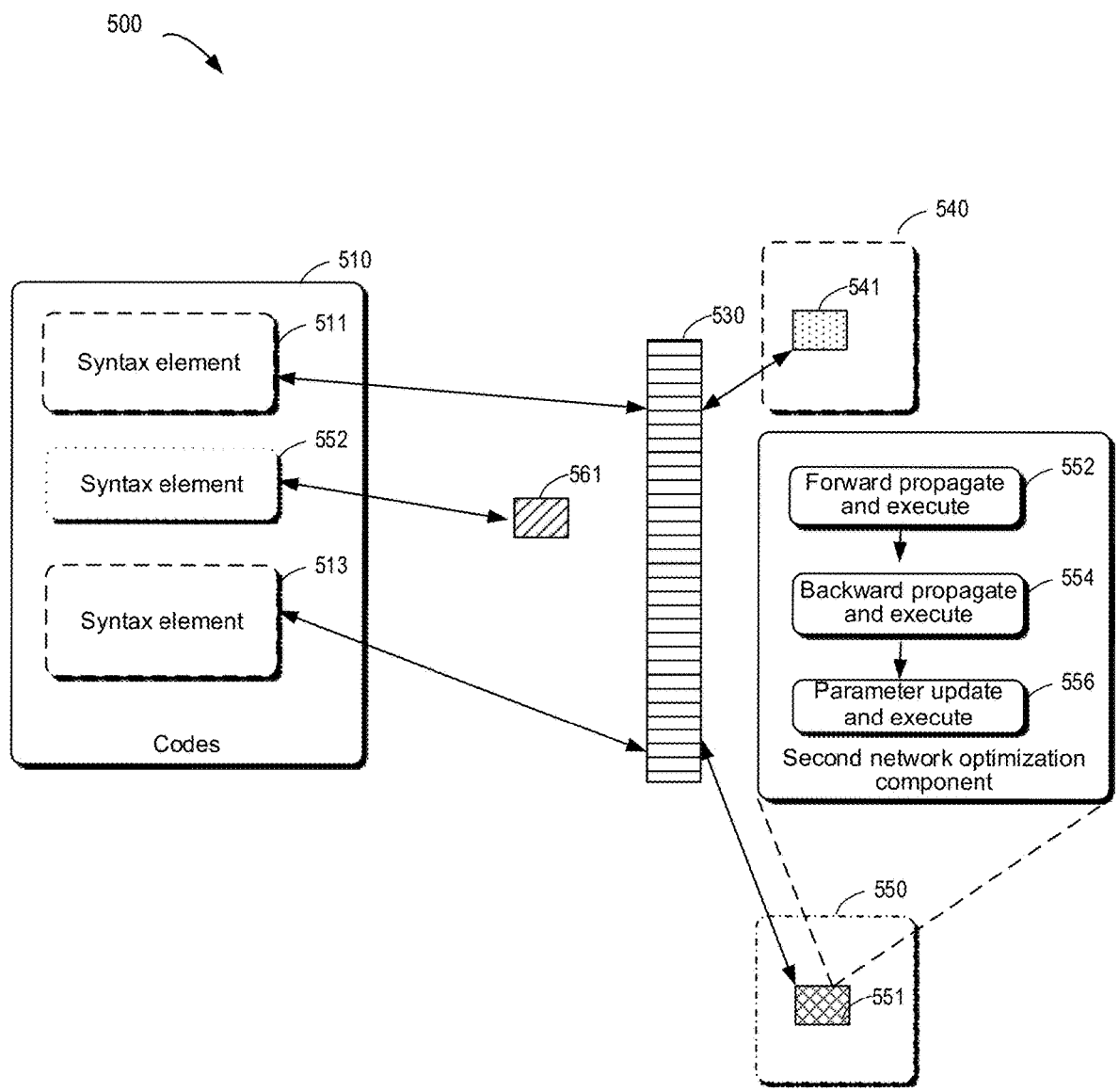
FIG. 5 shows a schematic diagram of a method of executing a network optimization component by a computing device according to some embodiments of the present disclosure.

FIG. 5 shows a schematic diagram of a method 500 of executing a network optimization component by the computing device 105 according to some embodiments of the present disclosure.

The network optimization component is configured to update a parameter to be optimized of the network model, for example, update the parameter to be optimized in a direction of negative gradient by using a stochastic gradient descent algorithm (SGD). In related schemes, due to the difference between the first execution mode and the second execution mode (real-time execution and phased execution) described above, the computing device 105 needs to invoke the network optimization components through different syntax elements.

According to the embodiments of the present disclosure, the network optimization components used in the first execution mode and the second execution mode may be designed to have the same component interface, that is, a network optimization component interface 530. The method of implementing the network optimization function in the first or second execution mode may also be encapsulated into the corresponding component 541 or 551, so that the codes 510 does not need to include different syntax elements corresponding to the method of implementing the network optimization function.

In the first execution mode, when the syntax element corresponding to the network optimization component interface 530 is executed by the computing device 105, the computing device 105 may update the parameter of the network model by using the first network optimization component 541 in the first component 540.

The computing device 105 may, for example, invoke the mode parameter update component 561 through the syntax element 512 in the codes 510 so as to switch the execution mode from the first execution mode to the second execution mode.

In the second execution mode, when the syntax element corresponding to the network optimization component interface 530 is executed by the computing device 105, the computing device 105 may update the network model parameter by using the second network optimization component 551 in the second component 550.

In some embodiments, both the second network optimization component and the first network optimization component invoke, for example, a transform layer component configured to perform an operation on the input data based on a weight parameter (for example, weight matrix W). For example, the operation may include an operation of multiplying the input data with the weight matrix.

In some embodiments, the first network optimization component may be configured to, when executed, cause the computing device to perform following steps separately (additionally or alternatively, sequentially) and output results separately. The steps include: determining a loss caused by the network model parameter; determining a gradient related to the network model parameter (for example, by using a loss function component); and determining the updated network model parameter (for example, by using a time step component configured to define an operation performed in each time step).

The second network optimization component may be configured to, when executed, cause the computing device to perform following steps separately (additionally or alternatively, sequentially). In step 552, a second computational graph for forward propagation is constructed to determine the loss caused by network model parameter. In step 554, a third computational graph for backward propagation is constructed to determine the gradient related to the network model parameter. In step 556, a fourth computational graph for updating the network model parameter is constructed to determine the updated network model parameter, so as to correspond to the step included in the executing the first network optimization component by the computing device 105. In this way, in the second execution mode, the computing device 105 may output results by stages in order for debugging.

In some embodiments, the network optimization component may use the network execution component as described above to simplify the codes to be read and the steps to be executed by the computing device 105. For example, the network execution component described above may be used in the calculation of the loss function and the calculation of the gradient in the backward propagation.

In some embodiments, the computing device 105 performs the steps of constructing the computational graph in step 552 to step 556 described above in only a first iteration. In subsequent iterations, the already constructed computational graph may be used to determine the loss function and/or the gradient and/or the updated network model parameter.

Figure 6:
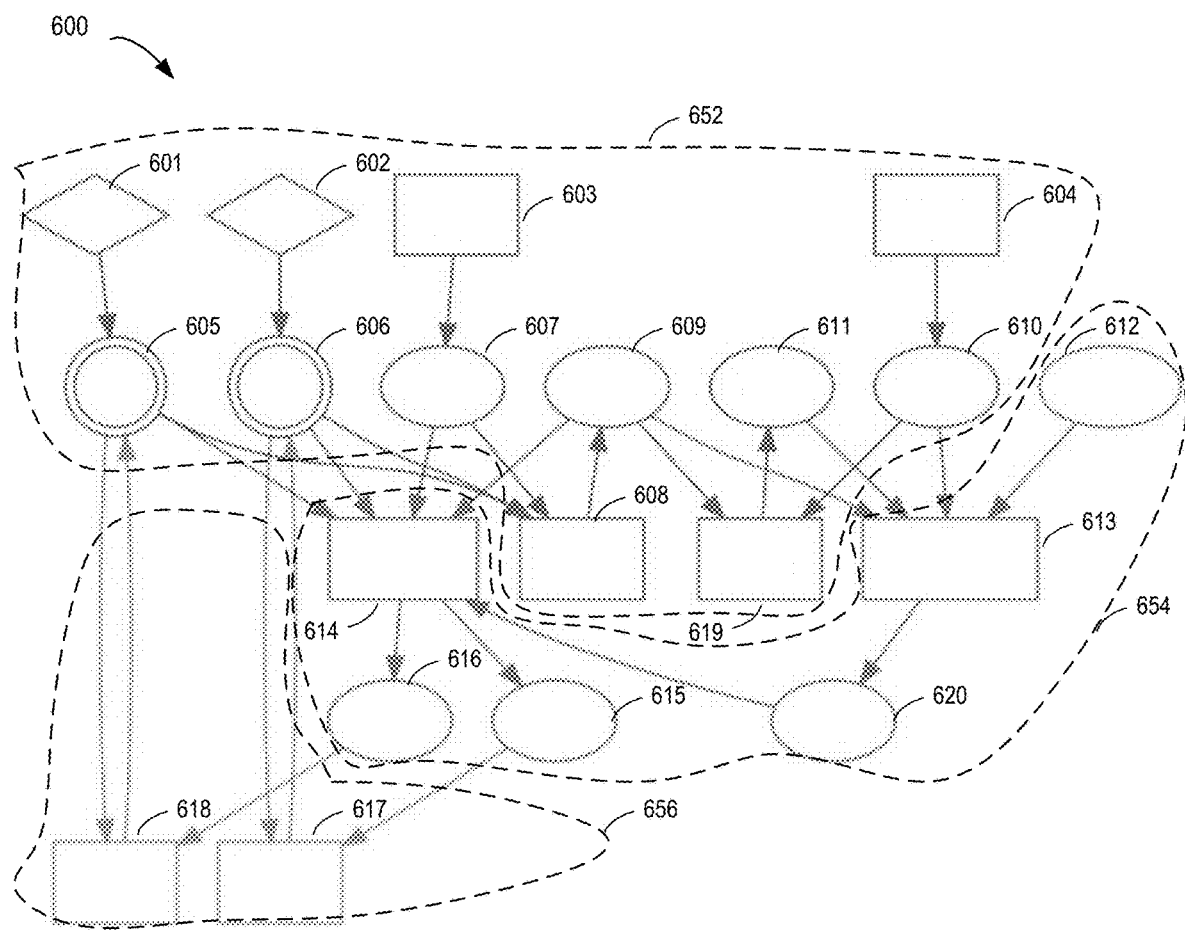
FIG. 6 shows a schematic diagram of a computational graph for updating a parameter according to some embodiments of the present disclosure.

The above steps are now described in detail with reference to FIG. 6. FIG. 6 shows a schematic diagram of a computational graph 600 used for updating a parameter according to some embodiments of the present disclosure. Specifically, the computational graph 600 corresponds to the step 552 to the step 556 described above. It may be understood that the computational graph 600 is only used for illustration. In practice, the computational graph determined by the computing device 105 according to the codes may include more and/or less and/or different computational nodes. For example, if learning rate adjustment is taken into account, the computational graph may include a node associated with the learning rate adjustment.

The computational graph 600 may include a forward propagation part 652, a backward propagation part 654, and a network model parameter update part 656.

In the second execution mode, by using the second network optimization component, the computing device 105 may firstly construct the computational graph (the second computational graph) of the forward propagation part 652, and perform corresponding operations by using the computational graph so as to obtain an output result of this part (for example, errors).

Specifically, the parameters to be optimized include a bias parameter 601 (for example, a bias parameter b) and a weight parameter 602 (for example, the weight matrix W). Initial values of the parameters to be optimized may be set by initialization operations 601 and 602. In the computational graph construction stage, a placeholder for occupying space may be constructed. In the computational graph execution stage, the placeholder may be used for an input of input data 607 through operation 603. Then, the computing device 105 may calculate an output 609 of the network model by operation 614 (for example, invoking the transform layer component as described above). The output 609 may be obtained by multiplying the input weight parameter 602 with the input data and then adding the bias parameter

601 (that is, w*x+b). In the computational graph construction stage, a placeholder for occupying space may be constructed, and a true value 610 corresponding to the output 609 may be input by operation 604 (which may be obtained, for example, by a labeled sample). In the computational graph execution stage, the computing device may perform an operation 619 (for example, a mean square error operation) on the output 609 and the true value 610 so as to obtain a loss 611 (sometimes referred to as an error) between the output 609 and the true value 610 of the network model. Then, the forward propagation ends. In this way, the computing device 105 may obtain the loss 611 by invoking the second network optimization component in the second execution mode, so as to facilitate the adjustment of the forward propagation.

Then, the computing device 105 may construct the computational graph (the third computational graph) of the backward propagation part 654 by using the second network optimization component, and perform corresponding operations by using the computational graph so as to obtain an output result of this part (data 615 and 616).

Specifically, based on the output 609, the loss 611, the real value 610, and the gradient 612 of the loss, the computing device 105 may obtain data 620 indicative of the gradient of the output 609 by performing operation 613 (for example, by calculating a sum of gradients of all outputs relative to each input). Based on the bias parameter 601, the weight parameter 602, the input data 607, the output 609 and the data 613, the computing device 105 may obtain data 615 and 616 respectively indicative of the gradient of the weight parameter 605 and the gradient of the bias parameter 606 by performing operation 614. Then, the backward propagation ends. In this way, the computing device 105 may obtain the data 615 and 616 indicative of the gradient of the weight parameter 605 and the gradient of the bias parameter 606 in the second execution mode, so as to facilitate the adjustment of the backward propagation.

Next, the computing device 105 may construct the computational graph (the fourth computational graph) of the network model parameter update part 656 by using the second network optimization component, perform corresponding operations by using the computational graph so as to obtain an output result of this part, and update the data 605 and 606 of the network model based on the output result.

Specifically, based on the data 615 and 616, the computing device may perform, for example, operations 617 and 618 (which may be performed by a random gradient descent SGD) to update the weight parameter 601 and the bias parameter 602, respectively.

Referring back to FIG. 5, in some embodiments, the first network optimization component may be configured to, when executed, cause the computing device 105 to uniformly perform following steps: determining the loss caused by the network model parameter; determining the gradient related to the network model parameter; and determining the updated network model parameter so as to output the result. This may be achieved by defining a unified function for the above steps and invoking the function, so that the corresponding result may be output when the function is invoked.

In related schemes, in the second execution mode, a component, that is configured to firstly add a backward network according to the computational graph forward network and then add a gradient update operator to the computational graph, is used to determine the computational graph, and then the determined computational graph is calculated by using the execution component. In contrast, according to the embodiments of the present disclosure, the computing device 105 may invoke the network optimization components by using the same syntax element through the same component interface. The computing device 105 may execute the execution logic included in the corresponding components respectively according to different execution modes, so as to support the optimization of the network model parameters in different execution modes.

Figure 7:
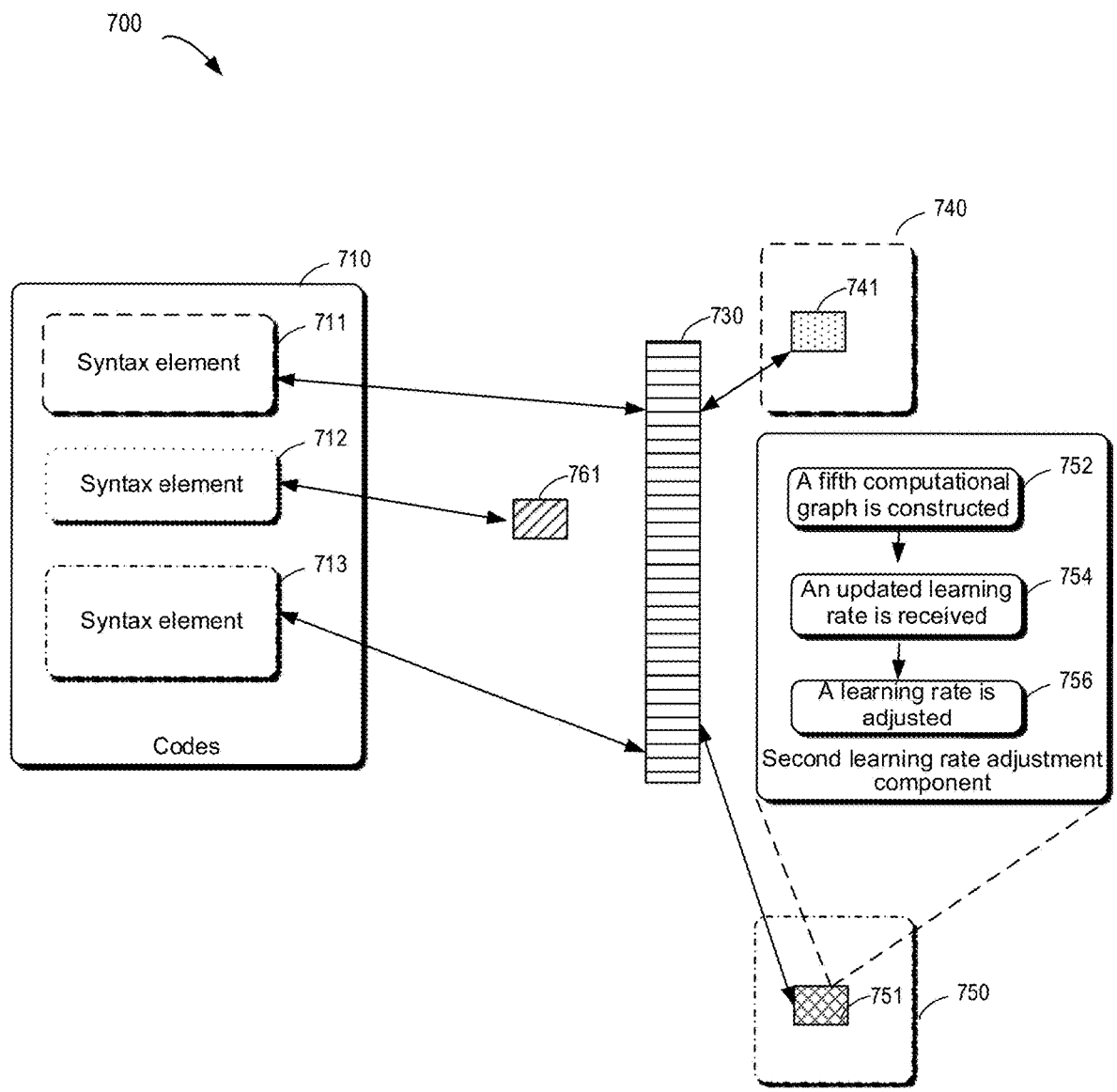
FIG. 7 shows a schematic diagram of a method of executing a learning rate adjustment component by a computing device according to some embodiments of the present disclosure.

FIG. 7 shows a schematic diagram of a method 700 of executing a learning rate adjustment component by the computing device 105 according to some embodiments of the present disclosure.

In related schemes, due to the difference between the first execution mode and the second execution mode (real-time execution and phased execution) described above, the computing device 105 invokes the network optimization components through different syntax elements. When the network optimization component performs parameter optimization of the network model, it is generally desired to determine the updated parameters according to Equation 1.

$$\text{param\_new} = \text{param} - \text{learning\_rate} * \text{grad} \qquad \text{(Equation 1)}$$

where param_new represents updated parameter, param represents non-updated parameter, learning_rate represents learning rate, and grad represents gradient.

It may be understood that the learning rate needs to be adjusted in the process of training the network model. Generally, the more iterations of training, the smaller the learning rate.

According to the embodiments of the present disclosure, the learning rate adjustment components used in the first execution mode and the second execution mode may be designed to have the same component interface, that is, a learning rate adjustment component interface 730. The method of implementing the learning rate adjustment function used in the second execution mode may also be encapsulated into the corresponding component 751, so that the codes 710 does not need to include different syntax elements corresponding to the method of implementing the learning rate adjustment function.

In the first execution mode, when the syntax element 711 corresponding to the learning rate adjustment component interface 730 is executed by the computing device 105, the computing device 105 may adjust the learning rate by using the first learning rate adjustment component 741 in the first component 740.

The computing device 105 may, for example, invoke the mode parameter update component 761 through the syntax element 712 in the codes 710 so as to switch the execution mode from the first execution mode to the second execution mode.

In the second execution mode, when the syntax element 713 (for example, same as the syntax element 711) corresponding to the learning rate adjustment component interface 730 is executed by the computing device 105, the computing device 105 may adjust the learning rate by using the second learning rate adjustment component 751 in the second component 750.

In the process of adjusting the learning rate, it is desired to calculate the updated learning rate. In the second execution mode, this may be implemented by setting corresponding computational graph node and inputting data into the node. The implementation process is complex and may cause a certain waste of resources.

In some embodiments, the second learning rate adjustment component 751 is configured to, when executed, cause the computing device 105 to perform following steps. In step 752, a fifth computational graph including the learning rate node is constructed, and the fifth computational graph does not include a node for updating the learning rate. In step 754, an updated value of the learning rate is received as an input of the learning rate node. In step 756, the learning rate is adjusted based on the fifth computational graph and the updated value of the learning rate.

Specifically, through the above operations, when the learning rate adjustment component (for example, the time step component described above used in the learning rate adjustment component) is invoked for the first time, the computing device 105 may change the original node used for the computational operation of updating the learning rate to the node for inputting the learning rate, and input the initial learning rate, in response to the fifth computational graph being generated. Then, the computing device 105 may transmit the updated learning rate to the corresponding node of the computational graph from the outside when the learning rate adjustment component (for example, the time step component) is invoked in a subsequent round, so as to update the network model parameter. The updated learning rate may be calculated by executing a program written in a language such as Python by the computing device 105.

In some embodiments, the network optimization component may use the network execution component and the network optimization component as described above to simplify the codes to be read and the steps to be executed by the computing device 105.

In this way, the steps to be performed by the computing device 105 in calculating the learning rate may be simplified, so as to reduce the overhead required to implement the calculation.

Figure 8:
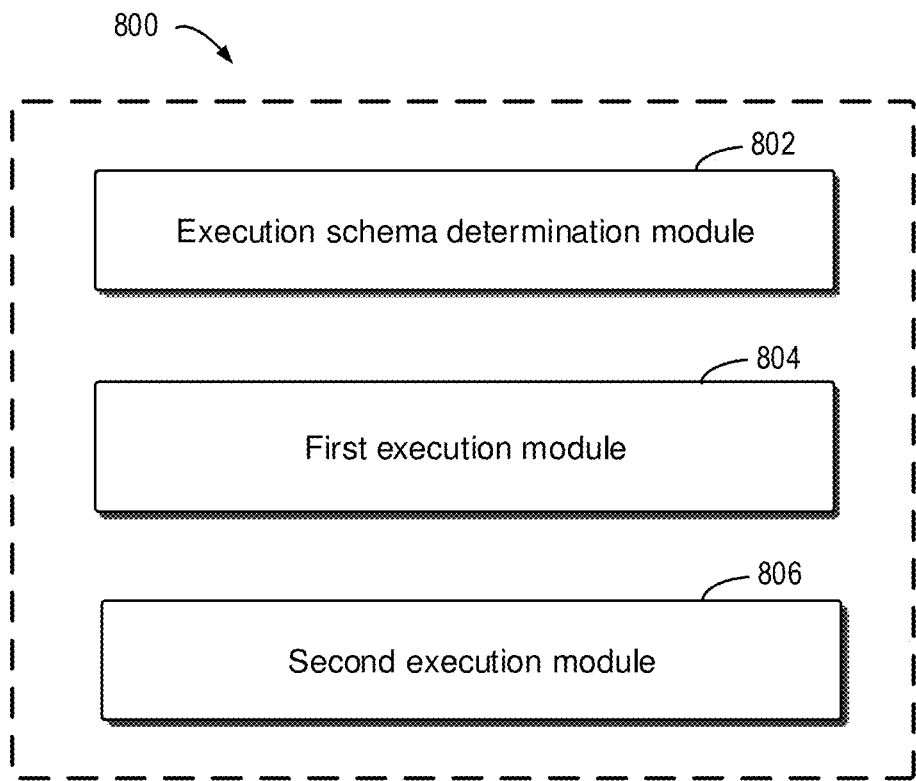
FIG. 8 shows a schematic block diagram of an apparatus 800 of constructing a network model for deep learning according to some embodiments of the present disclosure.

FIG. 8 shows a schematic block diagram of an apparatus 800 of constructing a network model for deep learning according to some embodiments of the present disclosure. As shown in FIG. 8, the apparatus 800 may include an execution mode determination module 802 configured to determine an execution mode for executing codes, based on a mode parameter. The apparatus 800 may further include a first execution module 804 configured to execute the codes by using a first component, which is executable in a first execution mode, through a syntax element in the codes, in response to determining that the execution mode is the first execution mode. The apparatus 800 may further include a second execution module 806 configured to execute the codes by using a second component, which is executable in a second execution mode, through the syntax element, in response to determining that the execution mode is the second execution mode. The first component and the second component have the same component interface, and the syntax element corresponds to the component interface.

In some embodiments, the component interface includes a control flow component interface. When a syntax element corresponding to the control flow interface is executed by the apparatus, the first execution module 804 is further configured to use a first control flow component in the first component in the first execution mode, and the second execution module 806 is further configured to use the second control flow component in the second component in the second execution mode.

In some embodiments, the component interface includes a network construction component interface. When a syntax element corresponding to the network construction component interface is executed by the apparatus, the first execution module 804 is further configured to use the network construction component through the first control flow component in the first execution mode, and the second execution module 806 is further configured to use the network construction component through the second control flow component in the second execution mode.

In some embodiments, the component interface includes a network execution component interface. When a syntax element corresponding to the network execution component interface is executed by the apparatus, the first execution module 804 is further configured to process the input data in the first execution mode by using a first network execution component in the first component, so as to obtain the output data, and the second execution module 806 is further configured to process the input data in the second execution mode by using the second network execution component in the second component, so as to obtain the output data.

In some embodiments, the second execution module 806 may be further configured to: when the second network execution component in the second component is executed, determine the first computational graph for the input data based on the input data; and process the input data based on the first computational graph, so as to obtain the output data.

In some embodiments, the component interface includes a network optimization component interface. When a syntax element corresponding to the network optimization component interface is executed by the apparatus, the first execution module 804 is further configured to update the network model parameter in the first execution mode by using a first network optimization component in the first component, and the second execution module 806 is further configured to update the network model parameter in the second execution mode by using the second network optimization component in the second component.

In some embodiments, the second execution module 806 may be further configured to: when the second network optimization component is executed by the apparatus, construct the second computational graph for the forward propagation so as to determine the loss caused by the network model parameter; construct the third computational graph for backward propagation so as to determine the gradient related to the network model parameter; and construct the fourth computational graph for gradient update so as to determine the updated network model parameters.

In some embodiments, the component interface includes a learning rate adjustment component interface. When a syntax element corresponding to the learning rate adjustment component interface is executed by the apparatus, the first execution module 804 is further configured to adjust the learning rate in the first execution mode by using a first learning rate adjustment component in the first component, so as to update the network model parameter, and the second execution module 806 is further configured to adjust the learning rate in the second execution mode by using the second learning rate adjustment component in the second component, so as to update the network model parameter.

In some embodiments, the second execution module 806 is further configured to: when the second learning rate adjustment component is executed by the apparatus, construct the fifth computational graph including the learning rate node but not including the node for updating the learning rate; receive an updated value of the learning rate as an input of the learning rate node; and adjust the learning rate based on the fifth computational graph and the updated value of the learning rate.

In some embodiments, the first execution module 804 is further configured to perform a first operation corresponding to the first component based on the input data associated with the syntax element, so as to determine the output data.

In some embodiments, the second execution module 806 is further configured to: determine a computational graph including a plurality of network nodes corresponding to a plurality of computing operations, by using a second operation corresponding to the second component; and determine the output data by the execution component using the computational graph, based on the input data associated with the syntax element.

In some embodiments, the first execution mode includes the dynamic graph mode, and the second execution mode includes the static graph mode.

According to the embodiments of the present disclosure, the present disclosure further provides an electronic device, a readable storage medium, and a computer program product.

Figure 9:
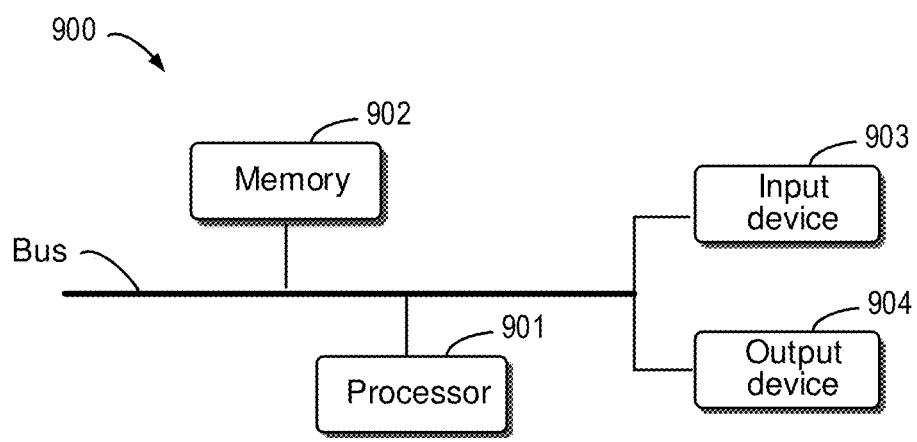
FIG. 9 shows a block diagram of an electronic device 900 for implementing various embodiments of the present disclosure.

FIG. 9 shows a block diagram of an electronic device 900 for implementing the method of constructing the network model for deep learning according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device may include one or more processors 901, a memory 902, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each apparatus providing a part of necessary operations (for example, as a server array, a group of blade servers, or a multi-processor system). In FIG. 9, one processor 901 is illustrated by way of example.

The memory 902 is a non-transitory computer-readable storage medium provided by the present disclosure. The memory stores instructions executable by at least one processor, to cause the at least one processor to perform the method of constructing the network model for deep learning provided in the present disclosure. The non-transitory computer-readable storage medium of the present disclosure stores computer instructions for allowing a computer to perform the method of constructing the network model for deep learning provided in the present disclosure.

The memory 902, as a non-transitory computer-readable storage medium, may be used to store non-transitory software programs, non-transitory computer-executable programs and modules, such as program instructions/modules corresponding to the method of constructing the network model for deep learning in the embodiments of the present disclosure (for example, the execution mode determination module 802, the first execution module 804, and the second execution module 806 shown in FIG. 8). The processor 901 executes various functional applications and data processing of the server by executing the non-transient software programs, instructions and modules stored in the memory 902, thereby implementing the method of constructing the network model for deep learning in the embodiments of the method mentioned above.

The memory 902 may include a program storage area and a data storage area. The program storage area may store an operating system and an application program required by at least one function. The data storage area may store data etc. generated by using the electronic device 1100 according to the method of determining the guide path or the method of controlling driving of the vehicle. In addition, the memory 902 may include a high-speed random access memory, and may further include a non-transitory memory, such as at least one magnetic disk storage device, a flash memory device, or other non-transitory solid-state storage devices. In some embodiments, the memory 902 may optionally include a memory provided remotely with respect to the processor 901, and such remote memory may be connected through a network to the electronic device for implementing the method of constructing the network model for deep learning. Examples of the above-mentioned network include, but are not limited to the Internet, intranet, local area network, mobile communication network, and combination thereof.

The electronic device for implementing the method of constructing the network model for deep learning may further include an input device 903 and an output device 904. The processor 901, the memory 902, the input device 903 and the output device 904 may be connected by a bus or in other manners. In FIG. 9, the connection by a bus is illustrated by way of example.

The input device 903 may receive input information of numbers or character, and generate key input signals related to user settings and function control of the electronic device for implementing the method of constructing the network model for deep learning, such as a touch screen, a keypad, a mouse, a track pad, a touchpad, a pointing stick, one or more mouse buttons, a trackball, a joystick, and so on. The output device 904 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred as programs, software, software applications, or codes) include machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server in combination with block chains.

By unifying the interface for the two execution modes (for example, the dynamic graph and the static graph), developers need to write just one set of codes to run in two execution modes. The computing device may execute this set of codes in the dynamic graph mode and the static graph mode respectively. In this way, it is possible to keep both the advantages of the dynamic graph (that is, easy to debug) and the advantages of the static graph (that is, convenient for global optimization and prediction deployment), and avoid rewriting the codes or performing dynamic-static conversion on the codes.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the protection scope of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of constructing a network model for deep learning, comprising:
    determining an execution mode for executing codes used in constructing the network model, based on a mode parameter;
    executing a first syntax element in the codes by using a first component, which is available in a first execution mode, in response to determining that the execution mode is the first execution mode; and
    executing the first syntax element in the codes by using a second component, which is available in a second execution mode, in response to determining that the execution mode is the second execution mode, without converting the codes;
    wherein when the codes include a second syntax element for enabling the second execution mode, the mode parameter is updated to enable the second execution mode in response to executing the second syntax element, and when the codes include a third syntax element for disabling the second execution mode, the mode parameter is updated to enable the first execution mode in response to executing the third syntax element,
    wherein the first component and the second component have the same component interface, and the first syntax element corresponds to the component interface, and
    wherein the first execution mode comprises a dynamic graph mode, and the second execution mode comprises a static graph mode.

2. The method of claim 1, wherein the component interface comprises a control flow component interface; and
    wherein the method further comprises: when the first syntax element corresponding to the control flow component interface is executed,
    in the first execution mode, using a first control flow component in the first component; and
    in the second execution mode, using a second control flow component in the second component.

3. The method of claim 2, wherein the component interface further comprises a network construction component interface; and
    wherein the method further comprises: when the first syntax element corresponding to the network construction component interface is executed,
    in the first execution mode, using a network construction component through the first control flow component; and
    in the second execution mode, using the network construction component through the second control flow component.

4. The method of claim 1, wherein the component interface comprises a network execution component interface; and
    wherein the method further comprises: when the first syntax element corresponding to the network execution component interface is executed,
    in the first execution mode, processing input data by using a first network execution component in the first component, so as to obtain output data; and in the second execution mode, processing input data by using a second network execution component in the second component, so as to obtain output data.

5. The method of claim 4, further comprising: when the second network execution component in the second component is executed,
determining a first computational graph for the input data based on the input data; and
processing the input data based on the first computational graph, so as to obtain the output data.

6. The method of claim 1, wherein the component interface comprises a network optimization component interface; and
wherein the method further comprises: when the first syntax element corresponding to the network optimization component interface is executed,
in the first execution mode, updating a network model parameter by using a first network optimization component in the first component; and
in the second execution mode, updating a network model parameter by using a second network optimization component in the second component.

7. The method of claim 6, further comprising: when the second network optimization component is executed,
constructing a second computational graph for forward propagation so as to determine a loss caused by the network model parameter;
constructing a third computational graph for backward propagation so as to determine a gradient associated with the network model parameter; and
constructing a fourth computational graph for updating the network model parameter so as to determine an updated network model parameter.

8. The method of claim 1, wherein the component interface comprises a learning rate adjustment component interface; and
wherein the method further comprises: when the first syntax element corresponding to the learning rate adjustment component interface is executed,
in the first execution mode, adjusting a learning rate by using a first learning rate adjustment component in the first component, so as to update the network model parameter; and
in the second execution mode, adjust a learning rate by using a second learning rate adjustment component in the second component, so as to update the network model parameter.

9. The method of claim 8, further comprising: when the second learning rate adjustment component is executed,
constructing a fifth computational graph comprising a learning rate node, wherein the fifth computational graph does not comprise a node for updating the learning rate;
receiving an updated value of the learning rate as an input of the learning rate node; and
adjusting the learning rate based on the fifth computational graph and the updated value of the learning rate.

10. The method of claim 1, wherein the executing the first syntax element in the codes by using the first component comprises:
performing a first operation corresponding to the first component based on input data associated with the first syntax element, so as to determine output data.

11. The method of claim 1, wherein the executing the first syntax element in the codes by using the second component comprises:
determining a computational graph, which comprises a plurality of network nodes corresponding to a plurality of computing operations, by using a second operation corresponding to the second component; and
determining output data by an execution component using the computational graph, based on input data associated with the first syntax element.

12. An electronic device, comprising:
at least one processor; and
a memory communicatively connected to the at least one processor, wherein the memory stores instructions executable by the at least one processor, and the instructions, when executed by the at least one processor, cause the at least one processor to implement the method of claim 1.

13. A non-transitory computer-readable storage medium having computer instructions stored thereon, wherein the computer instructions allow a computer to implement the method of claim 1.

* * * * *